United States Patent [19]

Gallup

[11] Patent Number: 5,614,100
[45] Date of Patent: *Mar. 25, 1997

[54] METHOD FOR WATER REMEDIATION

[75] Inventor: Darrell L. Gallup, Chino Hills, Calif.

[73] Assignee: Union Oil Company of California, El Segundo, Calif.

[ * ] Notice: The term of this patent shall not extend beyond the expiration date of Pat. No. 5,531,902.

[21] Appl. No.: 229,692

[22] Filed: Apr. 19, 1994

Related U.S. Application Data

[63] Continuation-in-part of Ser. No. 996,310, Dec. 23, 1992, abandoned.

[51] Int. Cl.$^6$ ........................................................ C02F 9/00
[52] U.S. Cl. .......................... 210/665; 210/669; 210/673; 210/674; 210/692
[58] Field of Search ............................ 210/669, 673–676, 210/691–694, 799, DIG. 5, 665, 670, 688, 671

[56] References Cited

U.S. PATENT DOCUMENTS

| | | | |
|---|---|---|---|
| 3,520,806 | 7/1970 | Haigh | 210/692 |
| 3,965,036 | 6/1976 | Himmelstein | 210/674 |
| 4,061,724 | 12/1977 | Grose et al. | 423/335 |
| 4,105,549 | 8/1978 | Kakumoto et al. | 210/675 |
| 4,186,085 | 1/1980 | Savage | 210/673 |
| 4,267,055 | 5/1981 | Neely | 210/670 |
| 4,517,094 | 5/1985 | Beall | 210/694 |
| 5,069,795 | 12/1991 | Romey et al. | 210/799 |
| 5,104,545 | 4/1992 | Means et al. | 210/699 |
| 5,126,050 | 6/1992 | Irvine et al. | 210/694 |
| 5,158,681 | 10/1992 | Freeman et al. | 210/641 |
| 5,207,895 | 5/1993 | Basseen et al. | 210/DIG. 5 |
| 5,227,071 | 7/1993 | Torline et al. | 210/694 |

OTHER PUBLICATIONS

"Water Demineralization Benefits from Continuous Ion Exchange Process," by J. Newman, *Chemical Engineering*, Dec. 18, 1967, pp. 72–74.

"Saving Capital and Chemicals with Countercurrent Ion Exchange," by M. E. Gilwood, *Chemical Engineering*, Dec. 18, 1967, pp. 83–88.

"EC–100 The Carbon Extender," *Biomin International Inc.*, Huntington Woods, MI.

*Primary Examiner*—Ivars Cintins
*Attorney, Agent, or Firm*—Alan H. Thompson; Gregory F. Wirzbicki

[57] ABSTRACT

Large volumes of waste water stream containing oil, greases, sometimes ferric ions, and dissolved contaminant hydrocarbons such as BTEX are rapidly treated in two stages. Initially, the oils and greases are separated, then the dissolved contaminant hydrocarbons are removed by countercurrent adsorption on powdered resinous polymeric adsorbents in an exchange zone, preferably in the absence of ferric ions. The contaminant laden adsorbents are regenerated and continuously recycled to the exchange zone.

57 Claims, 1 Drawing Sheet

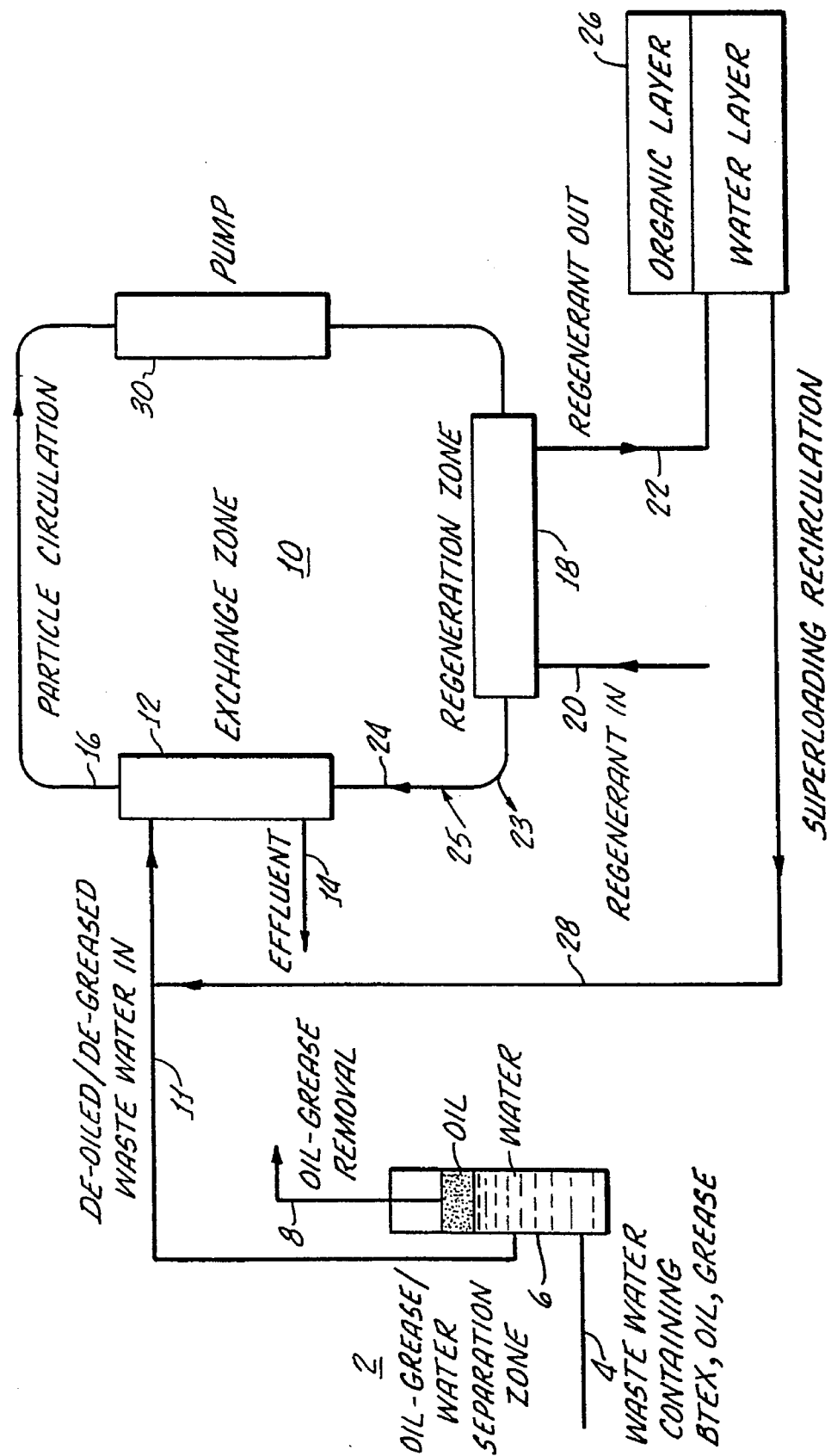

METHOD FOR WATER REMEDIATION

RELATED APPLICATIONS

This application is a continuation-in-part application of application U.S. Ser. No. 07/996,310, filed Dec. 23, 1992, now abandoned, the disclosure of which is incorporated by reference herein in its entirety.

BACKGROUND OF THE INVENTION

1. Field of the Invention

This invention relates to methods of removing unwanted impurities from water. In particular, this invention relates to methods of removing unwanted hydrocarbons from water, especially low molecular weight monocyclic aromatic hydrocarbons, oils and greases.

2. State of the Art

Oilfield-produced waters, remediation site waters, contaminated ground waters and refinery runoff streams all may contain high concentrations of hydrocarbons. These petroleum processing-derived waste waters contain particularly high concentrations of several classes of organic compounds due to the high water solubility of these classes of compounds. The low molecular weight monocyclic aromatic hydrocarbons, and some other structurally related non-hydrocarbon monocyclic aromatic compounds, for example, benzene, toluene, ethylbenzene, and the three isomers of xylene, i.e., orthoxylene, metaxylene and paraxylene, (a mixture of at least three of the above named components dissolved in waste water will hereinafter be referred to as BTEX), comprise one such class of relatively highly water soluble hydrocarbons. Other common dissolved contaminant hydrocarbons or organics include styrene, thiophenes, and pyridine. However, other less soluble hydrocarbons, such as aliphatic hydrocarbons found in diesel and jet fuels and in gasoline, also pollute water and must be removed. Because of health concerns, regulators have reduced the maximum acceptable concentration of BTEX in water to very low concentrations, typically <5 ppmw. Consequently, producers of BTEX-contaminated water need to remove or greatly reduce the concentrations of all these polluting hydrocarbons in produced aqueous runoff streams.

Several technologies allow treatment of water to reduce the concentrations of BTEX and other hydrocarbons. These technologies include UV/ozone oxidation, UV/peroxide oxidation, high intensity UV destruction, powdered activated carbon adsorption coupled with biological treatment, granular activated carbon adsorption, air/gas stripping followed by volatile organic carbon (VOC) capture, various membrane processes, and supercritical water oxidation. While all of these technologies work acceptably well, they all require a fairly large physical plant to treat water produced on an industrial scale. For that reason, space-critical producers, for example, off shore oil platforms and the like, require different techniques to process the water they produce. A need exists for an effective water remediation method easily usable in space-critical areas.

Countercurrent technology, primarily used in high flow rate applications, presents a candidate for a small, space-critical water remediation unit since countercurrent installations typically have a small "footprint", that is, they are installations that require little plant area. Conventionally, countercurrent units soften and deionize water. In these conventional units, a countercurrent ion exchange resin removes inorganic components, for example, cations such as magnesium, iron or calcium, or inorganic anions. However, no countercurrent adsorption method has been designed to remove organic components, such as BTEX, diesel and gasoline components, using powdered adsorbent(s) suspended or bedded in essentially an aqueous fluid.

It would be advantageous to have a small footprint countercurrent unit that removes BTEX and other hydrocarbons from water to a maximum concentration of less than 5 ppmw, and particularly at relatively high flow rates, e.g., above 10 gallons per minute per square foot of adsorbent bed. The inventor has found that countercurrent technology can provide a unit that removes at least 75% of the total BTEX from a waste water stream. The unit also provides a means to remove other, non-aromatic hydrocarbons from a waste water stream.

In my co-pending patent application U.S. Ser. No. 07/996,310, highly effective hydrophobic powdered adsorbents are used in an exchange (adsorption) zone in a countercurrent water remediation method to remove BTEX. The deactivated or spent adsorbents (containing adsorbed BTEX) are continuously regenerated and then recycled to the exchange zone. Furthermore, the waste water stream may also contain water-insoluble hydrocarbons, such as crude oils, greases, lube oils, sludges, heavy diesel ends, other oils, and the like. Such water-insolubles can also be removed from the waste water stream by using the highly effective hydrophobic adsorbents in the countercurrent method. However, problems have arisen during regeneration of the spent adsorbents containing both BTEX and the water-insolubles. A need exists for an effective water remediation method when the waste water contains dissolved contaminant hydrocarbons usually including BTEX, and water-insoluble oils and greases.

SUMMARY OF THE INVENTION

It has been discovered that polymeric resin adsorbents which are highly effective for removing dissolved contaminant hydrocarbons from waste water streams can quickly lose their adsorption capacity when water-insolubles (i.e., oils and greases) and/or ferric ion materials are also extracted from the waste water stream onto such adsorbents. Under these circumstances the polymer resin adsorbents are not readily regenerated to original or fresh capacity for adsorbing the dissolved contaminant hydrocarbons. In the present invention, the accumulation of the oils, greases, ferric ions, and the like, onto the polymer resin adsorbents is substantially reduced or essentially prevented. Thus, the invention allows the adsorbents to effectively adsorb the dissolved contaminant hydrocarbons and still be readily regenerated to substantially full capacity.

The invention relates to a two-stage, non-biological method for first removing water-insoluble hydrocarbons and/or ferric ions or ferric-ion precursors and then removing dissolved contaminant hydrocarbons from a waste water stream. In the first stage, a substantial proportion of water-insoluble contaminant hydrocarbons is removed from a waste water stream. The second stage involves contacting the remaining waste water stream containing a mixture of dissolved contaminant hydrocarbons and/or BTEX, with either a stationary (i.e., fixed) or moving bed of adsorbent particles in an exchange (adsorption) zone, preferably in the absence of ferric ions. The hydrophobic adsorbents selectively adsorb the dissolved contaminant hydrocarbons. It has been found that the highly effective adsorbent particles can be completely regenerated several times when essentially no water insoluble hydrocarbons and/or ferric ion-containing materials are adsorbed on the adsorbent particles during removal of the dissolved contaminant hydrocarbons in the exchange zone.

BTEX and other unwanted hydrocarbon components of diesel fuel and gasoline, as well as water-insoluble oils and greases, may be removed from oil field contaminated groundwater and refinery water waste streams by separation techniques followed by fixed bed and/or countercurrent adsorption techniques. Normally the waste water is treated at a relatively high rate, i.e., a liquid hourly space velocity greater than about 15. In the two-stage method, essentially all (i.e., more than 90 weight percent) the water-insoluble hydrocarbons are first removed from the waste water stream by any means that effectively separate water-insoluble hydrocarbons from the remaining waste water and, subsequently in the second stage, the resultant contaminated waste water is contacted with adsorbent particles selected to adsorb BTEX and other dissolved hydrocarbons. In the second stage, powdered polymeric resin adsorbent particles are contacted by the resultant waste water in the exchange zone and preferably circulate countercurrent to the flow of the waste water stream. The exchange zone in the second stage contains (1) the waste water containing the dissolved contaminant hydrocarbons, (2) the adsorbent particles, and (3) essentially no added or supplemented organic solvents. The second stage preferentially removes at least 75% of the total dissolved contaminant hydrocarbons from the waste water stream (and without changing the relative proportions of the components comprising the dissolved contaminant hydrocarbons by more than 50%).

One embodiment of the invention is a method for removing BTEX and/or other dissolved hydrocarbons from produced waste water streams by first reducing the oils and/or greases contained in the waste water stream to less than about 10–20 ppmw by employing oil-water separating means such as a liquid-liquid coalescer or a hydrocyclone. Ferric ions or ferric ion precursors, if also contained in the waste water, are usually removed prior to separation of the oils and greases. The resultant waste water stream, still containing BTEX (typically more than 1 ppmw), then contacts and flows through a moving bed of highly effective powdered polymeric resin adsorbent particles. In a preferred embodiment, the adsorbent particles form a bed moving, at pre-determined time intervals, countercurrent to the waste water flow, and interact with BTEX in an exchange zone that contains no added hydrocarbon-containing solvent, to preferentially remove at least 75% of the total BTEX and/or total dissolved contaminant hydrocarbons from the waste water stream.

Another aspect of the invention involves continuously regenerating the deactivated (contaminant laden) polymeric resin adsorbent particles outside the exchange zone while moving the particles countercurrent to the flow of the waste water. When adsorption of oils and greases (and ferric ions) with the adsorbent particles is minimized in the exchange zone, the adsorbent particles can be multiply-regenerated to original fresh adsorption capacity. The deactivated adsorbent particles continuously leave the exchange zone at pre-determined intervals, and then move through a regeneration zone where a regenerant flows over (and contacts) the particles countercurrently to the direction of particle flow. An aqueous, fluidized portion of the fresh adsorbent particles is then continuously recycled to the exchange zone.

The two-stage method has the advantage of protecting the highly effective BTEX-removing adsorbents from poisoning by oils and greases and/or ferric ions (or ferric ion precursors) contained in the waste water streams remediated in the invention.

BRIEF DESCRIPTION OF THE DRAWING

The drawing shows a schematic flow diagram for one system that can benefit from using this invention.

DETAILED DESCRIPTION OF THE INVENTION

Three challenges face the designer of a water remediation unit using adsorbents. First, a useful candidate adsorbent must extract essentially all the unwanted components from an aqueous waste stream. Second, the unit must regenerate the candidate adsorbent. Third, the regenerated adsorbent must not be poisoned, e.g., the adsorbent must be capable of being regenerated at least once (and preferably several times) to original (or fresh) adsorption capacity. As used herein, an adsorbent is considered "poisoned" when its fresh adsorption capacity for adsorbing dissolved contaminant hydrocarbons is reduced by at least 20 percent when utilized in its regenerated form.

In my co-pending patent application U.S. Ser. No. 07/996,310, the polymeric resinous adsorbents, such as Ambersorb 572 and 563, are highly effective for adsorbing dissolved contaminant hydrocarbons from waste water streams. After sufficient contact with the waste water in the adsorption or exchange zone, the adsorbents become at least partially deactivated, i.e., lose a portion of their adsorption capacity, and must be regenerated to a condition for again removing dissolved contaminant hydrocarbons from water. However, when the waste water streams also contain water-insoluble hydrocarbons and/or ferric ions or ferric-ion precursors that contact such adsorbents in the exchange zone, the adsorbents become poisoned and cannot be readily regenerated to original or fresh capacity. Thus, some of the water-insoluble hydrocarbons and/or ferric ions or ferric-ion precursors must be removed from the waste water stream in the first stage of the method of the invention so the highly effective adsorbents in the second stage exchange zone can be (1) protected from poisoning and (2) regenerated to suitable freshness.

The waste water ordinarily treated by the method of the invention contains both water-insoluble organic contaminants and dissolved contaminant hydrocarbons. The water-insoluble hydrocarbon contaminants, usually contain at least 9 carbon atoms (i.e., $C_{9+}$-containing molecules), and normally at least $C_{12+}$-molecules. The soluble or dissolved hydrocarbon contaminants typically contain $C_{12-}$-molecules, and usually contain $C_{9-}$-molecules. The waste water stream treated by the invention ordinarily contains non-emulsified water-insoluble organic contaminants. Typically, the waste water contains more than 10 ppmw of total water-insoluble organic contaminants. In the first stage the waste water feedstream contains about 10 to about 350 ppmw of total water insoluble organics (i.e., oils and greases) which are reduced to a concentration less than about 15 ppmw of total water-insolubles, and preferably reduced to less than 10 ppmw in the resultant waste water effluent stream in order to protect the adsorbent particles in the second stage exchange zone from being poisoned too quickly. It is highly preferred that the total water-insolubles be reduced to a concentration less than 5 ppmw in the resultant waste water stream. Normally at least 50, preferably at least 80, more preferably at least 90, and most preferably at least 95 weight percent of the total water-insolubles are removed from the waste water in the first stage.

An unusual feature of the first stage of the invention is the protection of the second-stage polymeric, resinous adsorbent particles from poisoning due to their contact with (and adsorption of) ferric ion-containing materials. Typically above about 1 ppmw of total ferric ions (calculated as Fe) in the resultant waste water stream contacting the adsorbent particles in the exchange zone poisons the adsorbent in a similar manner as do the water-insoluble contaminant hydrocarbons. In other words, the fully regenerated adsorbents previously contaminated with adsorbed ferric ions exhibit reduced adsorption capacity just as in the presence of the water-insoluble contaminant hydrocarbons. Sources of ferric ions contained in the waste water stream include precursors such as free iron and ferrous ions (in addition to existing ferric ions).

The ferric ions can be removed from the waste water stream in the first stage by any effective means, such as by precipitating ferric ions from the water. The ferric ions or ferric-ion precursors can be removed from the waste water stream prior to or simultaneously with removal of some of the water-insoluble hydrocarbons. Typically, an oxidizing agent such as air (oxygen, ozone, peroxide, etc.) can be added to the waste water to reduce ferric ion precursors to ferric ions so that ferric hydroxide can be precipitated and filtered from the waste water prior to removal of the water-insoluble organics. Also, reduction of the ferric ion precursors can be accomplished by passing the waste water through a free-iron containing material such as steel wool, and the like, although other reducing agents may be employed, such as those disclosed in my U.S. Pat. No. 5,073,270, issued Dec. 17, 1991, the disclosure of which is incorporated by reference herein in its entirety. Furthermore, conventional removal of ferrous salts in the waste water with "greensand" can concurrently remove a portion of the water-insoluble organics. Greensand typically performs like a granular filter, although the water-insoluble organics are not adsorbed. Another method to prevent ferric-ion contact with the adsorbent particles in the second stage exchange zone is to minimize (or eliminate) contact of air with the resultant waste water produced from the first stage, e.g., prevention of oxidation of ferric ion precursors (such as ferrous salts) to ferric ions prior to adsorbent-waste water contact in the downstream exchange zone.

Although only a minor amount (sometimes none) of the dissolved contaminant hydrocarbons is removed in the first stage, the resultant waste water stream produced from the first stage normally contains a concentration of the dissolved contaminant hydrocarbons that still concerns environmental regulators. Both the waste water stream fed to the first stage and fed to the second stage of the inventive method contain more than 1, and usually more than 10 ppmw, of total dissolved contaminant hydrocarbons usually including BTEX. A typical concentration of total dissolved contaminant hydrocarbon and/or BTEX in the waste water stream fed to either the first or second stage is about 1 to about 400 ppmw; however, a waste water stream containing a range from 10 to 400 ppmw is treated most often. The product water stream from the two-stage method usually contains total dissolved contaminant hydrocarbons, and particularly total BTEX and/or total diesel and/or total gasoline, in a concentration less than 1 ppmw, and preferably less than 0.05 ppmw. The most preferred product water streams produced in accordance with the invention contain sufficiently low concentrations of both water-insolubles and dissolved contaminant hydrocarbons to pass animal consumption water standards.

Ordinarily, at least 50 weight percent, and preferably at least 60 weight percent, of the total dissolved contaminant hydrocarbons contained in the waste water is removed in the second stage by the adsorbents. The adsorbent in the exchange zone preferentially removes at least 75% of the total BTEX from the waste water stream. The phrase "preferentially remove at least 75% of the total BTEX from the waste water stream," as used herein, means that the adsorbent system must remove at least 75% of all BTEX from the waste water stream. If other hydrocarbons are present, irrespective of how much of the other hydrocarbons are removed, at least 75% of BTEX present is removed. BTEX is by its definition a mixture, and the three or more components that comprise any BTEX will form a composition ratio. After the waste water has passed through the exchange zone, the amount of reduction in concentration of each of the components will form a reduction ratio. In this invention BTEX will not be substantially partitioned by the particles, that is, the reduction ratio of the component least reduced to the component most reduced will not change by more than 50% from its relative amount in the composition ratio, i.e., does not vary by a factor of more than 2. For example, if a particular BTEX mixture contains benzene, toluene, paraxylene and metaxylene, in a 1:1:1:1 composition ratio (in dimensionless concentration), respectively, the freshened water will typically contain those same components in a reduced concentration in a composition ratio of 0.5:0.5:0.5:0.25, since the reduction ratio of the component(s) least reduced—benzene, toluene and paraxylene, (i.e., 0.5) to the component most reduced—metaxylene (i.e., 0.25), does not change by more than 50% (calculated as 0.5/0.25=2); however, the freshened water usually does not contain, for example, those same components in a composition ratio of 0.5:0.5:0.5:0.1, since the reduction ratio of the component(s) least reduced—benzene, toluene and paraxylene, (i.e., 0.5) to the component most reduced—metaxylene (i.e., 0.1), changes by more than 50% (calculated as 0.5/0.1=5). In another example, a 1:1:1:1 composition ratio (dimensionless concentration) of the same components supra, reduced to a composition ratio of 0.7:0.4:0.5:0.6, would be acceptable freshened water since the reduction ratio of the component least reduced—benzene, (i.e., 0.7) to the component most reduced—toluene (i.e., 0.4) does not change by more than 50% (calculated as 0.7/0.4=1.75). It is highly preferred that the ratio not change by more than 25%, i.e., does not vary by a factor of more than 1.

Any conventional fixed bed or countercurrent unit can be adapted for use in removing organic components, particularly BTEX, from waste water streams. When a small "footprint" is not a primary concern, fixed or stationary beds of adsorbents may be utilized. In the invention, fixed bed systems are ordinarily useful for processing waste water streams at rates less than 200–250 gallons per minute; however, when rates exceed 200, and usually exceed 250 gallons per minute, countercurrent units are normally more effective.

Although fixed bed units may be employed, countercurrent units are preferred in the second stage of the method of this invention. Manufacturers currently market several "countercurrent" loops. The Figure shows the details of one, but any of several others may be substituted. The critical details of the invention are a) that the adsorbent remove a substantial amount, preferably at least 75%, of the contaminating hydrocarbon from the waste water stream, and b) that the method of regeneration remove substantially all the contaminants from the adsorbent particles. In the preferred countercurrent embodiment, the adsorbent particles must circulate through both the exchange and regeneration zones rather than occupy a fixed (stationary) bed. A brief analysis of one countercurrent system will illustrate how the system works to remove organic components from water.

Referring to FIG. 1, in the first stage of the method of the invention, shown generally as 2, the waste water feed containing oil and/or grease and BTEX (after being pretreated, if needed, to remove ferric ions or its precursors by methods not shown) enters an oil-grease/water separation zone 6 via introduction line 4. Separation zone 6 contains any conventional means for separating the water-insoluble contaminant hydrocarbons, such as oils, greases, sludges, and the like, and mixtures thereof, from water or water-containing solutions. A conventional hydrocyclone unit for separating oil-grease from water is useful. Other effective separating means are filters, either employed alone, or in combination with other separating means (either upstream or downstream of additional separating means). Typical filter cartridge materials include granular activated carbon (GAC), clay adsorbents including modified bentonite and anthracite such as EC-100, EC-199, PT-1E, and others manufactured by Biomin International Inc., and filter cartridges from Serfilco, Ltd. A highly preferred oil-grease/water (or aqueous solution) separating means is a conventional liquid-liquid coalescer, for example, an Osmonics LS-180 pyrex coalescer, but preferably larger, more durable models that process commercial level through-puts.

The waste water stream, having its water-insoluble hydrocarbon concentration reduced to less than about 20, and preferably less than 10 ppmw, in oil-grease/water separation zone 6 (and removed via oil and grease removal line 8), is passed to the second stage of the method of the invention, i.e., to a countercurrent loop, shown generally as 10, through the waste water introduction line 11. The waste water fills the exchange zone 12, and moves downwardly through it (as shown in the drawing). The adsorbent particles are momentarily stationary while the unwanted organic components are adsorbed by the particles. The freshened waste water effluent leaves the zone through the waste water effluent line 14. At predetermined intervals, some portion of the (deactivated contaminated) particles leave the exchange zone through the particle removal line 16, ordinarily as an aqueous slurry or suspension. The contaminant laden adsorbent particles circulate through the countercurrent loop 10 in a direction countercurrent to the direction taken by the waste water stream. The contaminant laden particles are then pumped through a regeneration zone 18, usually located outside the exchange zone.

The regeneration zone 18 of the loop, the lower portion of the countercurrent loop as shown, regenerates the circulating contaminant laden adsorbent particles by removing the adsorbed organic material. In the regeneration zone the contaminant laden adsorbent particles contact a second fluid to remove the adsorbed BTEX. The regenerant fluids or solvents, i.e., regenerants, include organic solvents such as water miscible acetone and ethanol or water immiscible light hydrocarbons, for example hexane; however, an inorganic regeneration media is preferred, such as steam, hot water (i.e., above 50° C. to 100° C.), hot pressurized water (i.e., temperatures above 50° C. to about 180° C. and pressure above 1 atmosphere) or aqueous solutions such as salt-containing solutions. The regenerants circulate countercurrent to the adsorbent particles. The regenerant enters the countercurrent loop through the regenerant line 20 and flows past the particles contacting them in countercurrent fashion before exiting through the regeneration solvent effluent line 22. The regenerated adsorbent particles leave the regeneration zone via the regenerated particle line 24. It is preferred that the length of line 24 be as short as possible before the particles, typically in the form of fluidized particles, such as a mixture of fresh adsorbent particles and water vapor or a liquid aqueous slurry, are reintroduced into the exchange zone 12. It is highly preferred that the fluidized regenerated adsorbent particles from line 24 reintroduced into exchange zone 12 not contain organic solvent from the regeneration zone. Accordingly, and particularly in the case where water, water vapor, water-based solutions, or steam, are not the regenerant in regeneration zone 18, a disposal and return means via lines 23 and 25 allows the remediation engineer to remove excess organic solvent from the regenerated particles in a solvent-removed zone (not shown) and return them to line 24 for entry into exchange zone 12. The adsorbent particles move through the entire loop, adsorbing BTEX in the exchange zone, being regenerated in the regeneration zone, and recycled, normally in aqueous fluid, as fresh regenerated particles to the exchange zone where no additional organic solvent components are present other than those contained in the waste water feed stream.

The regenerant leaving the regeneration zone through line 22 goes to organic holding tank 26. Although the amount of organics typically removed from the contaminant laden adsorbent particles is small, a two phase system will eventually form in the organic holding tank as the solubility of organics in water is exceeded. The organic layer can be removed for processing into refined products or other proper disposal. It is preferred that a positive disposal technique for utilizing the organic layer be used, that is, the organic layer not merely be disposed of. The contaminated aqueous solution formed in the holding tank can be recycled back, through the super-loading recirculation line 28, to the waste water feed to "super-load" the waste water feed with excess BTEX and other hydrocarbons. A small amount of contaminated water at nearly a saturated concentration of BTEX will always be left behind for disposal. However, the volume of concentrated contaminated water will be much less than the volume of less concentrated contaminated water that traversed through the exchange zone.

The adsorbent particles are propelled through the loop, out of the exchange zone and on to the regeneration zone, by the adsorbent particle pumping means 30. The adsorbent particle pumping means moves particles around the countercurrent loop from the exchange zone to the regeneration loop. The pumping means comprises not only the mechanical pump but the valves and associated hardware required to maintain the flow of the particles. Conventional disclosures such as J. Newman, "Water Demineralization Benefits from Continuous Ion Exchange Process," *Chemical Engineering*, Dec. 18, 1967, pages 72–74, and M. E. Gilwood, "Saving Capital and Chemicals with Countercurrent Ion Exchange," *Chemical Engineering*, Dec. 18, 1967, pages 83–88, both references hereby incorporated in full by reference, disclose the details of the pumping mechanism of several different kinds of countercurrent systems. A full discussion of the details of these conventional mechanisms is beyond the scope of this disclosure. Among the different countercurrent schemes discussed in these articles are the Degremont-Cottrell continuous ion-regeneration process, the Asahi process, the Chemical Separations process, and the Permutit CCIX system. These systems, and variations of these systems, can all be used in the invention. Any pumping mechanism that moves fluidized particles, as opposed to a system where the waste water flows over a stationary bed of particles, is intended to be encompassed by the scope of the countercurrent method.

The rates of processing the waste water stream through both the first and second stages of the method of the invention are generally the same. Ordinarily, the residence time of the adsorbent particles in contact with the waste water in the second stage exchange zone determines the overall rate of the inventive method. For example, the liquid hourly space velocity (i.e., LHSV) is normally relatively high, i.e., greater than 15. It is preferred that the LHSV be above 30 and preferably from about 40 to about 400, and most preferably above 60. From another perspective, the flow rate of the waste water stream passing through a fictional cross-sectional planar surface in the exchange zone, particularly in the countercurrent embodiment, is greater than 10, and preferably at least 12 gallons per minute per square foot, and often ranges from 150 to 8400 gallons per minute per square foot. When the waste water flow rate is about 1000 gallons per minute through a 4–8 square foot exchange zone diameter, the flow rate ranges from about 20 to about 100 gallons per minute per square foot. Typically the second stage residence time (i.e., adsorbent particle bed contact time) of the waste water in the exchange zone is about 0.1 to 10 minutes, but preferably less than 2 minutes, and most preferably between about 0.1 and 2 minutes. On the basis of gallons of waste water per cubic foot of the exchange zone, generally the waste water is processed at a rate greater than 2 gallons per cubic foot, preferably greater than 4, and most preferably greater than about 8 gallons per cubic foot.

It should be realized that, although the particles are conventionally referred to, in the second stage of the invention, as having "countercurrent" flow compared to the waste stream, in the systems identified above, the particles are generally stationary while the waste water flows through the particle bed to contact the particles. Then at preset intervals, the waste water flow momentarily stops while the pump moves a portion of the particles around the countercurrent loop in a direction opposite (countercurrent) to the direction of waste water flow. The particles therefore form what is defined herein as a "moving bed." Usually from 10 to 50% of the adsorbent particles in the contact (exchange) zone are removed and replaced by fresh adsorbent particles. The advantage to this flow scheme is that the least processed waste water contacts the particles having the greatest loading of BTEX and other hydrocarbons, and as a result, the cleanest waste water contacts the freshest particles.

It should be further realized that when the adsorbent particles are located in the exchange zone in a fixed or stationary bed that the particles can be regenerated in-situ or passed to a separate regeneration zone, regenerated with the previously mentioned regenerants, and returned to the exchange zone. Where a large footprint and/or hot water or steam regenerants are readily available, such as at or near a petroleum refinery or production field, a fixed bed embodiment of the invention can be employed.

Both the adsorbent selectivity and the adsorbent particle size must be correct for the system to remove unwanted organic material from a waste water feed. Organic resins that adsorb organic components or inorganic adsorbents that adsorb organic components comprise the family of candidate adsorbent particles having the correct adsorbent selectivity. Examples of organic adsorbents are polymeric resins, carbonaceous resins (essentially pyrolyzed ion exchange resins), activated charcoal; examples of inorganic adsorbents are hydrophobic silicas and zeolites. Preferred adsorbents contain polymeric resin components, more particularly partially pyrolized, microporous, resinous polymer materials. Examples of the preferred polymeric resin adsorbents include those available from Rohm and Haas under the trade names "Ambersorb-563," "Ambersorb-564," "Ambersorb-348F," "Ambersorb-575," "Ambersorb-572," and "Ambersorb-1500." Other preferred polymeric adsorbents available from Rohm and Haas include polyaromatic adsorbents having the trade names "Amberlite XAD-2," "Amberlite XAD-4," and "Amberlite XAD-16," acrylic ester-based adsorbents having the trade names "Amberlite XAD-7," and "Amberlite XAD-8," and phenolic-based adsorbent "Duolite S-761." Still other preferred polymeric adsorbents available from Dow Chemical, Inc., are macroporous styrenic polymer adsorbents having the trade names "XUS-43493.00" and "XUS-43493.01."

The adsorbent particles preferably easily transit through the loop. Easy transit is assured by proper particle size; preferably the particles are powdered—having a cross-sectional dimension between about 4 and 150 Tyler mesh size, more preferably between 6 and 120 mesh. It is preferred that the median Tyler mesh size of the particles be greater than 12, usually from 12 to 60, and it is highly preferred that essentially all the particles have a Tyler mesh size greater than 15, but preferably in the range from 20 to 50. This selected dimension prevents particle packing in the countercurrent loop, ensuring that the particles will be pumpable throughout the loop. The particles can be made of any suitable material to adsorb the particular combination of BTEX known to be in the water, but it is essential that the adsorbent particles not partition the BTEX, that is, not be preferential for adsorbing one component of BTEX while not adsorbing another. Furthermore, the adsorbent should preferably remove at least 75% of the BTEX (and other hydrocarbons if present) from the waste aqueous stream.

In the countercurrent loop concept, organic pollutants load on the adsorbent in the exchange zone while the adsorbent particles are simultaneously stripped and regenerated in the regeneration zone. The adsorbent materials must be sufficiently hydrophobic to adsorb organic molecules preferentially over water. Steam, inexpensive organic solvents or even salt solutions strip the organic molecules from the adsorbents during regeneration. However, the strip solutions must be compatible with loop operation, particularly as described above, relative to organic vs. water-containing regenerants. Furthermore, it is greatly preferred that the strip solution not adversely affect the easy disposal of the organic layer by injection into oil fields, solvent refinery operations, or similar positive disposal techniques. Table 1 lists the adsorbents chosen for comparative study in the examples that follow and include activated carbons, molecular sieves, chromatographic-type adsorbents, carbonaceous beads and polymeric resin beads. The Examples show that the carbonaceous beads, polymeric resin beads and granulated carbon seem to be more efficient for removing the undesirable components from waste water streams.

TABLE 1

| Name | Description |
| --- | --- |
| Darco 12-20 ® | Darco GAC[1] 12–20 mesh |
| Darco 100-325 ® | Darco PAC[2] 100–325 mesh |
| Alpha 6-8 | Alpha GAC[1] 6–8 mesh pellet form |
| Ambersorb 563 ® | Rohm & Haas hydrophobic carbonaceous resin |
| Ambersorb 572 ® | Rohm & Haas mildly hydrophobic carbonaceous resin |
| Amberlite XAD 4 ™ | Rohm & Haas polymeric resin low pore size |
| Amberlite XAD 16 ™ | Rohm & Haas polymeric resin higher pore size |
| C4092 ZSM-5 | Porous hydrocracking catalyst |

TABLE 1-continued

| Name | Description |
| --- | --- |
| Zeolite | −20 mesh |
| ZSM-5 CA-1472B | Conteka zeolite powder in ⅛" "catalyst" pellet form |
| Silicalite C-2296 | Union Carbide molecular sieve in ⅛" "catalyst" pellet form |
| Amorphous silica | Baker silicic acid hydrate |
| Florisil | Baker mag-silicate chromatographic grade powder 60–100 mesh |
| Filter Cake | Unocal geothermal iron silicate flour |

[1]GAC means Granulated Activated Carbon
[2]PAC means Powdered Activated Carbon

The invention is further illustrated by the following examples which are illustrative of specific modes of practicing the invention and are not intended as limiting the scope of the invention in any manner as defined by the appended claims.

EXAMPLES

Example 1

In this example various adsorbents were tested for their ability to remove aromatics from Coalinga Nose Unit (CNU) produced water having a concentration of BTEX in the range of 20–30 ppmw. Eight different adsorbents were examined for removal of BTEX and total organic carbon (TOC) by passing samples of CNU produced water through packed columns of samples of adsorbent. The eluent was tested for the presence of aromatics by ultra-violet (UV) absorption, and standard EPA methods 418.1 and 8020.

CNU produced water passed through two-inch diameter columns each containing 100 g of one of the adsorbents tested. The CNU water passed through at a rate of 3 gpm/ft$^2$. The effective bed contact time was about one minute. The relative efficiencies at removing BTEX are shown in Table 2.

TABLE 2

| adsorbent | B&T Loading, mg | Breakthrough @5 ppm, BV | B&T regeneration, mg | Regeneration efficiency, % |
| --- | --- | --- | --- | --- |
| Darco GAC | 3138 | 200 | 3660 | 116 |
| Alpha AC | 3629 | 3 | 4940 | 136 |
| Ambersorb 563 | 5896 | 590 | 5236 | 89 |
| Ambersorb 572 | 8598 | 1160 | 9360 | 109 |
| XAD 4 | 1744 | 190 | 1390 | 80 |
| XAD 16 | 1211 | 150 | 926 | 76 |
| Silicalite | 830 | 55 | 630 | 76 |
| Filter Cake | 1076 | 75 | 716 | 16 |

Ambersorb 572 and 563, both carbonaceous polymeric ion exchange resins, removed the most benzene and toluene of all the adsorbents tested. These resins also exhibited the best breakthrough characteristics. After treating over 600 volumes of water, only 10 ppb BTEX was observed in the eluent from the Ambersorb 572 column. Furthermore, at that time, the Ambersorb 572 had not achieved 50% loading. It was observed that Ambersorb tended to load toluene in preference to benzene.

Darco and Alpha are granulated activated carbons (GAC) and are only about half as efficient at removing BTEX as the Ambersorb resins from the CNU produced water. The XAD resins (Rohm and Haas) performed well. They were particularly efficient at removing oil and grease (aliphatic hydrocarbons) from the water.

The hydrophilic silicas, silicalite catalyst and filter cake obtained from the Salton Sea Geothermal operations performed poorly.

Example 2

In this experiment the adsorbents of the first Example were regenerated with acetone.

About 2 liters of technical acetone flowed through the columns holding the adsorbents after the adsorption tests. The ratio of acetone to treated water was about 1:150. The results are shown in Table 2, columns 3 and 4. It can be seen that Ambersorb and GAC regenerated well, while the regeneration of XAD polymeric resins and silicalite was acceptable. The regeneration of the geothermal silicate was unacceptably difficult.

Example 3

This Example shows laboratory studies of the ability of different adsorbents to remove gasoline components.

Distilled water containing an average of about 94 ppm of dissolved unleaded gasoline passes through 4 ml of a respective adsorbent contained in 1 inch columns. In each experiment, the adsorbents contacted 1,000 bed volumes of gasoline-contaminated water at high flow rates ranging from 8–10 gpm/ft$^2$ (effective bed contact times of 0.4–0.6 minutes). Typical flow rates below 2 gpm/ft$^2$ used in carbon adsorption applications minimized leakage of contaminants from the adsorbent. Effluent samples were monitored "on-line" for UV adsorption and also for smell. After collection, analysis of the effluent by several different methods allowed determination of loading and chromatographic characteristics of the adsorbents.

The synthetic adsorbents, Ambersorb 572 and XAD-4 appeared to remove gasoline efficiently from water. Even after treating 1,000 bed volumes of water at abnormally high flow rates (i.e., above 10 gpm/ft$^2$), the effluents contained only very low concentrations of gasoline components. However, a small amount of methyl tertiary butyl ether, MTBE (octane booster), in the effluent was detected. Thus, it is apparent from these experiments that the synthetic adsorbents chromatographically separate gasoline components—BTEX and other "true" hydrocarbons are successfully adsorbed on the materials, while MTBE continuously leaks through the columns.

Darco granular activated carbon removed gasoline less efficiently from water than the synthetic adsorbents. Various gasoline components quickly broke through the column including MTBE.

Regeneration of the resin columns with acetone produced a significant gasoline "cut". A 100:1 water to solvent concentration ratio at a flow rate of ~0.3 gpm/ft$^2$ facilitated regeneration. Steam also regenerates the synthetic adsorbents. Thermal incineration of the adsorbed gasoline allows one other method to regenerate carbon adsorbents.

Synthetic adsorbents remediated water more efficiently than GAC. For remediation of gasoline-contaminated waters using pump and treat systems, the adsorbents may be excellent alternatives to GAC application. The adsorbents exhibit higher loading capacities, can tolerate very high flow rates, well above 10 gpm/ft$^2$, and can be more easily regenerated at lower energy cost than GACs. The adsorbents employed in a CCA loop arrangement will outperform fixed-bed GAC systems.

Example 4

This Example shows laboratory studies of the ability of different adsorbents to remove diesel components.

Studies similar to those reported above for gasoline were conducted with diesel-contaminated water. Mixtures of diesel in water in a concentration of about 195 ppmw flowed through laboratory columns loaded with the synthetic adsorbents and activated carbon. The Darco GAC carbon was nearly completely loaded (saturated) with diesel after 1000 bed volumes of diesel-contaminated water flowed through the column containing the adsorbent. The loading capacity for the carbon approached 340 mg contaminant/g carbon. After 400 bed volumes of diesel contaminated water flowed through the column at high flow rate, approximately 10 gpm/ft$^2$, breakthrough of diesel through the carbon column was excessive.

By contrast, even after 500 bed volumes at a very high flow rate, the synthetic adsorbents were not saturated with diesel. Although the adsorbents were not saturated, they appear to load more diesel than GAC. Ambersorb 572 "leaked" diesel early in the test, but later reduced the diesel concentration from 195 ppmw to only 5 ppmw at the end of the test. Lower flow rates of water through the column reduce leakage considerably. As in the gasoline case study described above, the synthetic adsorbents appeared to remove diesel from water more efficiently than GAC. Diesel adsorbed on the columns was completely stripped employing acetone. Steam regenerates the synthetic adsorbents.

Example 5

This example shows field and laboratory adsorption studies of real contaminated waters.

Applicant tested the adsorbents for complete loading and breakthrough employing an "on-line" field test kit at CNU. The field tests produced results similar to those conducted earlier in that Ambersorb 572 exhibited the highest loading capacity of the eight different materials tested. Steam regenerated the adsorbents in the laboratory.

In small laboratory columns, Darco GAC, Ambersorb 572 and XAD-4 removed organic contaminants from hydrocarbon-contaminated groundwater obtained from the Union Oil Company of California Carson Refinery. Each adsorbent was compared to the others. The three adsorbents remove BTEX from the water similarly. Oddly, in this test, the GAC apparently removed other, as yet unidentified, organics more efficiently than the synthetic adsorbents.

The resins were then regenerated as above using acetone.

It can be seen that countercurrent exchange technology, in conjunction with the correct adsorbent particles and regenerant, offers a convenient method that uses only a small amount of plant area to remove unwanted organic contaminants from waste water streams.

Example 6

Field tests conducted in a similar manner to those performed on the CNU waste water in Example 5 show oil and grease components contained in the waste water substantially reduce the capacity of Ambersorb 572 for adsorbing dissolved organic contaminants (e.g., poison the adsorbent) and cause inadequate or poor regeneration of the adsorbents with steam or acetone.

The CNU waste-water, containing approximately 80 ppmw of oil and grease in addition to the 20–30 ppmw of BTEX, is passed through a 500 ml cylinder (exchange zone) containing a bed of 250 g of Ambersorb 572 adsorbent particles having a median Tyler mesh size of approximately 30. The total BTEX concentration is reduced to less than 1 ppmw for the first 325 bed volumes and in the range from approximately 1 to 12 ppmw for the second 325 bed volumes. After approximately 650 bed volumes of waste water pass through the exchange zone, the Ambersorb 572 adsorbent is regenerated completely with steam to remove essentially all the adsorbed BTEX from the spent adsorbent. One hundred fifty (150) bed volumes of the CNU waste water are passed through the exchange zone containing the bed of regenerated Ambersorb 572 adsorbent and the total BTEX concentration in the product waste water is maintained at less than 1 ppmw, and at about 1 to 10 ppmw for the next 100 bed volumes.

Thus, the adsorption capacity of the regenerated Ambersorb 572 adsorbent particles is reduced at least 50 percent compared to the original fresh Ambersorb 572 adsorbent particles first contacted. Oil and grease from the CNU waste water plugged the mesopores of the Ambersorb 572 and poisoned the adsorbent particles.

Example 7

In field tests on water flood production water (from the East Coyote oil field in Fullerton, Calif.), containing 336 ppmw of non-emulsified, water-insoluble contaminant hydrocarbons (i.e., oils and greases) and 6.8 ppmw of dissolved contaminant hydrocarbons (i.e., BTEX), the contaminant hydrocarbons are reduced to less than 35 ppmw and less than 1 ppmw, respectively.

In a first stage, the East Coyote production water is passed through a Serfilco cartridge filter wound with propylene to exclude particles larger than 1 micron size and then passed to an Osmonics LS-180 pyrex liquid-liquid coalescer to separate the oils and greases from the water solution containing BTEX. In a second stage, the resultant production water from the coalescer is further passed through a column containing 500 ml of Ambersorb 572 adsorbent (approximately 250 grams) to remove BTEX therefrom at a rate of 0.15 gallons/minute (e.g., 64 bed volumes of adsorbent/hr, i.e., bv/hr). The method is conducted for approximately 28 hours and such a rate through the Ambersorb 572 adsorbent bed is approximately 8 gallons/minute/cubic feet (gpm/ft$^3$) which allows the adsorbent and resultant production water a residence time of about 1 minute. The rate through the filter and coalescer is coordinated with the rate through the adsorbent bed.

The filter and coalescer reduce the total water-insolubles in the groundwater by approximately 94 weight percent, and the Ambersorb 572-containing cylinder reduces the water-insolubles in the resultant production water by 52 weight percent. In other words, about 97 weight percent of the total water-insolubles is removed by the combined two stages. Furthermore, the filter and coalescer reduce the total dissolved contaminants by approximately 3 weight percent and the Ambersorb 572-containing cylinder reduces the dissolved contaminants in the resultant production water by 78 weight percent. Thus, about 62 weight percent of the total dissolved contaminants is removed in the combined two stages.

After regeneration of the contaminant laden Ambersorb 572 particles with steam, the regenerated particles are returned to the exchange zone.

Example 8

In a similar test to that in Example 7, except the wound propylene in the cartridge filter of the first stage is modified to exclude particles larger than 10 micron size. The groundwater is passed through the filter and coalescer at a rate of 0.75 gallons/minute (e.g., 320 bv/hr). Such a rate is approximately 40 gpm/ft$^3$ which provides a residence time of about 0.2 minutes.

The filter and coalescer reduce the total insolubles in the production water by approximately 87 weight percent and reduce the total dissolved contaminants by approximately 10 weight percent. The water-insolubles are always maintained below 22 ppmw for the duration of the test and below 10 ppmw for more than 80 percent of the duration.

In a second test similar to above, the coalescer is operated without the filter. In this test the total insolubles in the production water are reduced by the coalescer by approximately 88 weight percent, although essentially no dissolved contaminants are removed prior to passing the resultant water to the second stage.

Example 9

Two separate short-term tests are conducted for approximately 2⅓ hours in which the East Coyote production water of Example 7 is passed through separate columns of packed adsorbent particles at a rate of 8.6 bv/hr. The first column contains particles of Biomin EC-100 anthracite-clay mixture and the second contains particles of Petrolok Nuchar A620M granular carbon-styrofoam-like mixture.

The first column containing EC-100 removes approximately 93 weight percent of the water-insolubles and approximately 52 weight percent of the dissolved contaminants. However, the second column removes greater than 97 weight percent of the water-insolubles and approximately 91 weight percent of the dissolved contaminants.

While particular embodiments of the invention have been described, it will be understood, of course, that the invention is not limited thereto since many obvious modifications can be made, and it is intended to include within this invention any such modifications as will fall within the scope of the invention has defined by the appended claims.

What is claimed:

1. A method for removing water-insoluble contaminant hydrocarbons, ferric ions or ferric ion precursors and dissolved contaminant hydrocarbons contained in a waste water stream, said method comprising the following steps:

(1) removing some of said water-insoluble contaminant hydrocarbons and removing said ferric ions or ferric ion precursors from said waste water stream to produce a resultant waste water stream; and (2) contacting the resultant waste water stream obtained from step (1) in an exchange zone with particles comprising a polymeric resinous adsorbent to adsorb the dissolved contaminant hydrocarbons therefrom with at least some of said particles becoming deactivated.

2. The method defined in claim 1 wherein said particles move countercurrent to the direction of flow of said resultant waste water.

3. The method defined in claim 1 wherein said water-insoluble contaminant hydrocarbons are separated from said waste water by separating means selected from the group consisting of a filter, liquid-liquid coalescer, hydrocyclone, clay adsorbent and granular carbon-styrofoam mixture.

4. The method defined in claim 3 wherein said polymeric resinous adsorbent contains a component selected from the group consisting of acrylic-esters, phenols, polyaromatics, and styrenes.

5. The method defined in claim 1 wherein said water-insoluble contaminant hydrocarbons are separated from said waste water by a liquid-liquid coalescer.

6. The method defined in claim 1 wherein said adsorbent comprises a pyrolyzed microporous resinous polymer.

7. The method defined in claim 1 wherein said particles comprise Tyler mesh sizes in the range from about 12 to about 60.

8. The method defined in claim 1 wherein said resultant waste water passes through said exchange zone at a rate greater than 10 gallons per minute per square foot.

9. The method defined in claim 1 wherein said step (2) is conducted at a liquid hourly space velocity of about 30 to about 400.

10. The method defined in claim 1 wherein said dissolved contaminant hydrocarbons comprise at least three aromatic-containing contaminants selected from the group consisting of benzene, toluene, ethyl benzene and xylene.

11. The method defined in claim 1 wherein said water-insoluble contaminant hydrocarbons comprise oils or greases.

12. The method defined in claim 1 wherein said resultant waste water contains more than 1 ppmw of total dissolved contaminant hydrocarbons.

13. The method defined in claim 1 wherein said waste water contains about 10 to about 350 ppmw of total water-insoluble hydrocarbons.

14. The method defined in claim 1 wherein after step (2) said dissolved contaminant hydrocarbons are reduced to a concentration of less than 5 ppmw of total dissolved contaminant hydrocarbons.

15. The method defined in claim 1 wherein after step (1) said water-insoluble contaminant hydrocarbons are reduced to a concentration of less than about 15 ppmw of total water-insoluble contaminant hydrocarbons in said resultant waste water.

16. The method defined in claim 1 further comprising regenerating said deactivated particles in a step (3) to a condition suitable for again removing dissolved contaminant hydrocarbons from water.

17. The method defined in claim 16 wherein said adsorbent is regenerated with a regenerant selected from the group consisting of steam, hot pressurized water, organic solvent, and salt-containing aqueous solution.

18. The method defined in claim 16 further comprising recycling regenerated particles from step (3) to said exchange zone.

19. The method defined in claim 1 wherein said resultant waste water contacting said particles in step (2) contains less than about 1 ppmw of ferric ions.

20. The method of claim 1 wherein essentially all of said water-insoluble hydrocarbons are removed from said waste water stream.

21. A method for removing water-insoluble contaminant hydrocarbons, ferric ions or ferric ion precursors and dissolved contaminant hydrocarbons contained in a waste water stream, said method comprising:

separating some of said water-insoluble contaminant hydrocarbons and removing said ferric ions or ferric ion precursors from said waste water stream to produce a resultant waste water stream;

contacting the resultant waste water with a moving bed of polymeric resinous adsorbent particles in an exchange zone to adsorb said dissolved contaminant hydrocarbons with at least some of said particles becoming deactivated, said adsorbent particles moving through said exchange zone countercurrent to said resultant waste water flow;

passing some of said deactivated particles to a regeneration zone;

regenerating said deactivated adsorbent particles in said regeneration zone to a condition suitable for again adsorbing dissolved contaminant hydrocarbons contained in the resultant waste water stream; and recycling regenerated adsorbent particles obtained from said regeneration zone to the exchange zone.

22. The method defined in claim 21 wherein said water-insoluble contaminant hydrocarbons are separated from said resultant waste water by separating means selected from the group consisting of a filter, liquid-liquid coalescer, hydrocyclone, clay adsorbent and granular carbon-styrofoam mixture.

23. The method defined in claim 22 wherein said adsorbent is regenerated with steam or hot pressurized water.

24. The method defined in claim 23 wherein essentially all of said water-insoluble contaminant hydrocarbons is separated from said resultant waste water.

25. The method of claim 24 wherein said particles in said exchange zone comprise carbonaceous resins.

26. The method defined in claim 21 wherein said regenerated particles have more than 90 percent adsorption capacity compared to said adsorbent particles.

27. The method defined in claim 21 wherein said particles comprise Tyler mesh sizes in the range from about 12 to about 60.

28. The method defined in claim 21 wherein said resultant waste water passes through said exchange zone at a rate greater than 12 gallons per minute per square foot.

29. The method defined in claim 28 wherein said rate comprises a liquid hourly space velocity of about 30 to about 400.

30. The method defined in claim 21 wherein said adsorbent is regenerated with a regenerant selected from the group consisting of steam, hot pressurized water, organic solvent, and salt-containing aqueous solution.

31. The method defined in claim 21 wherein said dissolved contaminant hydrocarbons comprise at least three aromatic-containing contaminants selected from the group consisting of benzene, toluene, ethyl benzene and xylene.

32. The method defined in claim 21 wherein said water-insoluble contaminant hydrocarbons comprise oils or greases.

33. The method defined in claim 21 wherein said resultant waste water contains more than 1 ppmw of total dissolved hydrocarbons selected from the group consisting of compounds having molecules containing 1 to 12 carbon atoms.

34. The method defined in claim 33 wherein said exchange zone consists essentially of (1) said resultant waste water and (2) said particles or said regenerated particles.

35. The method defined in claim 21 wherein said waste water contains above about 10 ppmw of total water-insoluble hydrocarbons having molecules containing at least 9 carbon atoms.

36. The method defined in claim 21 wherein after said contacting said dissolved contaminant hydrocarbons are reduced to a concentration of less than 5 ppmw of total dissolved contaminant hydrocarbons.

37. The method defined in claim 21 wherein after said separating said water-insoluble contaminant hydrocarbons are reduced to a concentration of less than about 15 ppmw of total water-insoluble contaminant hydrocarbons in said resultant waste water.

38. The method defined in claim 21 wherein said exchange zone consists essentially of (1) said resultant waste water and (2) said particles or said regenerated particles.

39. The method defined in claim 21 wherein less than about 1 ppmw of ferric ions contacts said adsorbent particles in said exchange zone.

40. The method defined in claim 39 wherein said adsorbent particles in said exchange zone adsorb less than about 5 weight percent of ferric ions, calculated as Fe.

41. The method defined in claim 21 wherein said ferric ions or ferric ion precursors contained in said waste water are removed prior to or concurrently with said separating of said water-insoluble contaminant hydrocarbons from said waste water.

42. A method for reducing the concentration of water-insoluble contaminant hydrocarbons, ferric ions or ferric ion precursors and dissolved contaminant hydrocarbons contained in a waste water stream, said method comprising:

separating some of said water-insoluble contaminant hydrocarbons from said waste water utilizing a liquid-liquid coalescer and removing said ferric ions or ferric ion precursors from said waste water to produce a resultant waste water stream containing said dissolved contaminant hydrocarbons and a reduced concentration of said water-insoluble contaminant hydrocarbons and said ferric ions or ferric ion precursors;

contacting the resultant waste water with a moving bed of pyrolyzed microporous polymeric resinous adsorbent particles in an exchange zone consisting essentially of said resultant waste water and said adsorbent particles to adsorb said dissolved contaminant hydrocarbons with at least some of said adsorbent particles becoming deactivated, said resultant waste water flow moving through said exchange zone countercurrent to said adsorbent particles at a liquid hourly space velocity of greater than 15;

passing some of said deactivated particles to a regeneration zone;

regenerating said deactivated adsorbent particles in said regeneration zone to more than 90 percent adsorption capacity compared to said adsorbent particles, said deactivated adsorbent particles moving countercurrent to a regenerant contained in said regeneration zone; and recycling regenerated adsorbent particles obtained from said regeneration zone to said exchange zone.

43. The method defined in claim 42 wherein said dissolved contaminant hydrocarbons comprise at least three aromatic-containing contaminants selected from the group consisting of benzene, toluene, ethyl benzene and xylene.

44. The method defined in claim 42 wherein after said contacting said dissolved contaminant hydrocarbons are reduced to a concentration of less than 1 ppmw of total dissolved contaminant hydrocarbons.

45. The method defined in claim 42 wherein after said separating said water-insoluble contaminant hydrocarbons and said ferric ions or ferric ion precursors contained in said waste water are reduced to a concentration of less than about 10 ppmw of total water-insoluble contaminant hydrocarbons and less than about 1 ppmw of said ferric ions of ferric ion precursors in said resultant waste water, respectively.

46. The method defined in claim 42 wherein said liquid hourly space velocity is about 40 to about 400.

47. The method defined in claim 42 wherein said adsorbent is regenerated in said regeneration zone with a regenerant selected from the group consisting of steam, hot pressurized water, organic solvent, and salt-containing aqueous solution.

48. The method of claim 47 wherein said particles in said exchange zone comprise carbonaceous resins.

49. The method defined in claim 42 wherein said ferric ions or ferric ion precursors contained in said waste water are removed prior to or concurrently with said separating of said water-insoluble contaminant hydrocarbons from said waste water.

50. A method for removing ferric ions or ferric-ion precursors, water-insoluble contaminant hydrocarbons and dissolved contaminant hydrocarbons contained in a waste water stream, said method comprising:
   (1) removing a substantial proportion of said ferric ions or ferric-ion precursors and removing a substantial proportion of said water-insoluble contaminant hydrocarbons from said waste water stream to produce a resultant waste water stream;
   (2) contacting the resultant waste water stream obtained from step (1) in an exchange zone with particles comprising a polymeric resinous adsorbent to adsorb the dissolved contaminant hydrocarbons therefrom, with at least some of said particles becoming deactivated; and
   (3) regenerating said deactivated particles to a condition suitable for again removing dissolved contaminant hydrocarbons from water.

51. The method defined in claim 50 further comprising recycling regenerated particles from step (3) to said exchange zone.

52. The method defined in claim 50 wherein the removal of water-insoluble contaminant hydrocarbons from said waste water stream is subsequent to the removal of said ferric ions or ferric ion precursors from said waste stream.

53. The method defined in claim 52 wherein said adsorbent is regenerated in step (3) with a regenerant selected from the group consisting of steam, hot pressurized water, organic solvent, and salt-containing aqueous solution.

54. The method defined in claim 53 wherein said adsorbent is regenerated with steam or hot pressurized water.

55. The method of claim 54 wherein said particles in said exchange zone comprise carbonaceous resins.

56. The method of claim 53 wherein said particles in said exchange zone comprise carbonaceous resins.

57. The method defined in claim 50 wherein said particles move countercurrent to the direction of flow of said resultant waste water.

* * * * *